United States Patent Office 3,099,646
Patented July 30, 1963

3,099,646
PROCESS FOR ETHOXYLATING POLYVINYL ALCOHOL
Frank Scardiglia, Arlington Heights, William O. Ranky, Chicago, and Edward A. Knaggs, Deerfield, Ill., assignors to Reynolds Metals Company, Richmond, Va., a corporation of Delaware
No Drawing. Filed Apr. 13, 1961, Ser. No. 102,625
5 Claims. (Cl. 260—91.3)

This invention relates to the production of ethoxylated polyvinyl alcohol, sometimes referred to as hydroxy ethylated polyvinyl alcohol. More particularly, the invention relates to a novel and improved process for the ethoxylation of polyvinyl alcohols and to new and useful products obtained by this process.

Ethoxylated polyvinyl alcohols per se are old and well known as indicated, for example, in Schmidt U.S. Patent No. 1,971,662, which refers to their use as a sizing agent for artificial silk or the like threads. More recently issued Broderick U.S. Patent No. 2,844,570 also describes the preparation of ethoxylated polyvinyl alcohols of a resinous type useful in coating and impregnating compositions. Although a great deal of work has been done by various workers in the art concerning methods of ethoxylating polyvinyl alcohols, these methods have left something to be desired in a number of respects.

Also, the properties of ethoxylated polyvinyl alcohol prepared according to conventional methods have somewhat curtailed the usefulness of such products. For example, cast resin films of ethoxylated polyvinyl alcohol products manufactured according to conventional techniques have lacked flexibility at low temperatures and do not give strong bonding by heat sealing. The foregoing properties are of course highly desirable and in some instances essential to maximum utility, as for example, where the resin film is to be employed as a packaging material, either alone or as an element in a laminate.

In contrast, the instant invention provides a method that has a number of advantages. An important advantage of the method resides in its simplicity and reproducibility. The ability to reproduce products of relatively uniform characteristics and properties in processes of this type has presented a very difficult problem to the art. The present invention permits the reproduction of products of substantially uniform characteristics and properties. The invention also affords a particularly economical and uncomplicated procedure for the ethoxylation of polyvinyl alcohols and, further, provides a process which permits conventional filtration and/or evaporation in the separation and recovery of the ethoxylated polyvinyl alcohol product. Furthermore, the present process yields a product which is not unduly sensitive to the heat of reaction, that is, the ethoxylated polyvinyl alcohol does not undergo degradation of the polymer chain during the reaction period. This factor also contributes to the consistency and uniformity of the properties of the final product.

It is, therefore, an important object of the invention to provide a new and improved process for the ethoxylation of polyvinyl alcohols.

It is a further object of the invention to provide a simple, economical, and reproducible process for the ethoxylation of polyvinyl alcohols.

Yet another object of the invention is to provide an improved process for producing ethoxylated polyvinyl alcohol, which comprises reacting at specified temperatures and pressures an alkylene oxide with a predetermined quantity of polyvinyl alcohol dispersed in an inert liquid, in the absence of an added catalyst, and recovering from said liquid the alkylated polyvinyl alcohol.

Another object of the present invention is to provide new and useful ethoxylated polyvinyl alcohol products which yield cast resin films having properties superior to those obtained from ethoxylated polyvinyl alcohol obtained according to conventional methods.

An additional object of the instant invention is to provide a new process for the ethoxylation of polyvinyl alcohols which provides better control for the reaction and does not result in the degradation of the polymeric products during the reaction.

A further object of the present invention is to provide a method according to which the properties of the final ethoxylated polyvinyl alcohol product may be closely controlled.

Additional objects, features and advantages of the present invention will become apparent to those skilled in the art from the following detailed disclosure thereof.

In accordance with our invention, we have discovered a novel process for the ethoxylation of polyvinyl alcohol and have produced new and useful ethoxylated polyvinyl alcohol products.

The process of our invention comprises reacting at temperatures within the range of 80° to 120° C. and pressures within the range of 30 to 200 pounds per square inch, 25 to 40 parts by weight of ethylene oxide with 100-pound parts by weight of a polyvinyl alcohol while dispersed in from 100 to 600 parts by weight of an inert liquid in which said ethylene oxide, said polyvinyl alcohol and said ethoxylated polyvinyl alcohol are substantially insoluble, and recovering therefrom the ethoxylated polyvinyl alcohol. The polyvinyl alcohol which is employed as a reactant in the process is first treated to reduce its moisture content to the range of from 0.1 to 5 percent by weight of the polyvinyl alcohol, this limit being critical to the proper operation of the method and the obtainment of the desired products. The reaction is carried out in the absence of an alkoxylation catalyst.

The ethoxylated polyvinyl alcohol products of the present invention comprise ethoxylated polyvinyl alcohol having a free glycol content of from 3 to 18 percent by weight of the product and a combined ethylene oxide content of from 5 to 20 percent by weight of the product.

In order to obtain the advantageous properties of low temperature flexibility and heating sealability in resin films cast from ethoxylated polyvinyl alcohol, we have discovered that it is necessary to obtain in the product a balance between the percent of ethylene oxide which has been converted to glycols and the percent of ethylene oxide which has been substituted on the alcohol chain, that is, that has replaced hydroxyl groups from the alcohol. It has been found that, in order to obtain an ethoxylated polyvinyl alcohol which yields a resin film having superior properties, the percent ethylene oxide converted to ethylene glycols should be from 3 to 18 percent by weight of the product and the amount of ethylene oxide combined with the polyvinyl alcohol should be from 5 to 20 percent by weight of the product.

We have further discovered that the desired percentages of ethylene oxide converted to glycols, principally ethylene glycol, and combined ethylene oxide may be maintained or achieved by controlling the moisture content of the starting polyvinyl alcohol within critical limits of from 0.1 percent to 5.0 percent of moisture by weight of polyvinyl alcohol.

Polyvinyl alcohols are now available as a commercial product. These materials are ordinarily formed by initially polymerizing a vinyl ester of a lower alkanoic acid and then hydrolyzing to split off the acyl group. As the term "polyvinyl alcohol" is used herein, it includes the substantially completely hydrolyzed material just described.

A very important aspect of the present invention resides in the careful control effected over the moisture content of the polyvinyl alcohols used as starting materials in the present process. We have discovered that by controlling the moisture content of the polyvinyl alcohol, preferably within the range of from 0.1 to 5.0 percent by weight of the polyvinyl alcohol, many important advantages are realized both in conducting the process and in the products obtained by the process. Regarding the importance of controlling the moisture content of the polyvinyl alcohol, our belief, by which we do not intended to be bound or limited, is that the water initially present in the alcohol is converted to glycols during the ethoxylation reaction and that the presence of controlled amounts of glycols in the final product contributes importantly to the properties of the products, especially when they are employed in the form of cast resin films. Moreover, it is believed that the presence of the specified amount of moisture in the alcohol assists in the progress of the reaction by contributing to a better control of the replacement of hydroxy groups by ethylene oxide and by minimizing degradation of the products during reaction.

Ethylene oxide is commercially available as liquefied gas and is used in gaseous form in the practice of the instant invention.

It has been found that the ethylene oxide to polyvinyl alcohol ratio is significant in the practice of the invention. On the basis of 100 parts by weight of polyvinyl alcohol the amount of ethylene oxide used should range from a practical minimum of about 25 parts by weight to a practical maximum of about 40 parts by weight, and preferably about 35 to 40 parts by weight. Theoretically, the preferred reaction involves 36 parts by weight of ethylene oxide (per 100 parts of polyvinyl alcohol). As used herein, the terms "parts" and "percent" means parts and percent by weight unless otherwise specified.

Another aspect of the instant invention resides in the use of an inert liquid in which the particulate polyvinyl alcohol is dispersed during the reaction. This inert liquid is, of course, non-reactive chemically with the various other reactants in products, i.e., it is non-reactive chemically with ethylene oxide, polyvinyl alcohols, and the ethoxylated polyvinyl alcohol product. In addition, it is preferably that there are three phase, namely, liquid, solid and gaseous. Agitation is, of course, important in the practice of the instant invention for uniformity of reaction, better temperature control, avoidance of localized "hot spots," and the avoidance of the collection of solid particles at outlets of the reactor.

A particularly preferred liquid for use in the practice of the instant invention is an inert hydrocarbon which may be aromatic or paraffinic. This material preferably does not contain olefinic or acetylenic unsaturation. $C_5$–$C_{15}$ paraffinic hydrocarbons have been found to be particularly suitable. Another important factor in selecting the liquid dispersing medium to be used in the practice of the instant invention resides in the selection of one of suitable boiling point. The reaction is carried out under pressure and at elevated temperatures and the liquid is thus selected so that it is not so volatile as to generate excessive pressures during the reaction and also the liquid is selected so as not to be so difficultly volatilized that it cannot be removed readily from the final product. In this respect, a substantially $C_7$ paraffinic hydrocarbon available commercially as "Skellysolve C" has been found to be particularly useful. This material is a relatively close "cut" having a boiling range of about 90–100° C.

In prior art techniques for ethoxylating polyvinyl alcohol which employ a solvent or dispersion medium, one or more of the reactants or products is soluble in the medium. Also, it is common practice to include an ethoxylation catalyst in such systems. Such reaction systems, however, commonly have had important disadvantages. Notably, the rate of reaction has been difficult to control and, as a result, the properties of the product obtained have been undependable.

We have now discovered that the foregoing disadvantages may be overcome by conducting the ethoxylation in the presence of a reaction medium in which the products and reactants are all insoluble and in the absence of an ethoxylation catalyst. Proceeding in this manner, we obtain a more controlled reaction and are able to obtain products having predictably uniform properties.

In the practice of the instant invention the pressures employed are limited to some extent by the structure of the vessel used for carrying out the reaction and the practicality of using a reaction vessel equipped for exceedingly high pressures. The reaction pressure empolyed may range from a practical minimum of about 30 pounds per square inch to a practical maximum of about 200 pounds per square inch. The pressures given herein are gauge pressures. Preferably, the reaction pressure is within the range of about 45 to 55 pounds per square inch.

A particularly important feature of the instant method resides in the temperatures used. Since the reaction is carried out in the absence of any added catalyst, the temperature is a key to the control of the reaction rate. Of course, agitation is particularly important in the practice of the instant invention in order to maintain a substantially uniform temperature throughout the entire reaction mass or dispersion. The rate of feeding the ethylene oxide into the reaction vessel also is significant in controlling the reaction temperature. Preferably, the reaction dispersion is so agitated and/or recirculated as to continuously pass by a heat exchange surface whereby adequate temperature control may be effected. The reaction temperature may range from a practical minimum of about 80° C., below which no appreciable reaction speed is obtained, to a practical maximum of about 120° C., above which appreciable discoloration of the product takes place. In fact, the best results are obtained maintaining the reaction temperature within the range of about 95° to 105° C.

Another aspect in controlling the reaction system resides in the ratio of polyvinyl alcohol to liquid carrier or dispersing medium. Based on 100 parts of polyvinyl alcohol, it has been found that a practical minimum of about 100 parts of carrier liquid may be used to obtain adequate dispersion and temperature control. The desired fluidity of the reaction system controls the minimum liquid content thereof. The practical maximum liquid content (per 100 parts of polyvinyl alcohol) is about 600 parts. A preferred ratio is about 125 to 175 parts of liquid to 100 parts of polyvinyl alcohol.

A general description of the method for ethoxylating polyvinyl alcohol may be helpful to a better understanding of the invention.

First, samples are taken from the supply of polyvinyl alcohol which is to be used as a starting material in the reaction. These samples are composited and assayed for moisture content by the Dean-Stark method. Enough water must be removed from the polyvinyl alcohol prior to the beginning of the reaction so that the total water content is reduced to the range of 0.1 and 5.0 percent by weight of the polyvinyl alcohol on a solids basis.

The removal of moisture from the polyvinyl alcohol is preferably carried out in the reaction vessel itself. We prefer to introduce the desired amount of inert reaction medium, Skellysolve C, and polyvinyl alcohol into the reaction chamber, purge the head space with an inert gas such as nitrogen and then heat the slurry of polyvinyl alcohol and reaction medium to a temperature of about 150° to 160° F. to begin distillation of water. As distillation proceeds the temperature within the reaction chamber will be raised to about 180° to 190° F. A condenser is attached to the reaction chamber for collection of Skellysolve C and water which is distilled from the chamber. Skellysolve C and water are substantially insoluble and form two layers in the condenser. The water from the lower layer is removed and the Skellysolve C top layer is recycled to the reaction vessel. Considering, for example, the instance where the charge of 700 pounds of polyvinyl alcohol has been introduced into the reaction vessel with about 1120 pounds of Skellysolve C, approximately 1 pound of water will have to be removed by distillation for every percent of moisture content of the polyvinyl alcohol above the desired level per 100 pounds of the polyvinyl alcohol charge. Thus, if the polyvinyl alcohol starting materials contains 8 percent moisture and it is desired to reduce the moisture content to approximately 4 percent, it will be necessary to distill off about 28 pounds of water from a starting charge of 700 pounds of polyvinyl alcohol. When the calculated amount of water has been distilled, a sample of the slurry may be taken through a drain valve in the reaction vessel and may be analyzed for moisture content. When the desired moisture level of the polyvinyl alcohol has been reached, the head space may again be purged with nitrogen and the slurry is then heated to about 205° F., at which temperature the internal pressure of the reaction vessel is generally about 20 p.s.i. The introduction of gaseous ethylene oxide into the reaction system is then begun. The ethylene oxide is added slowly, either continuously or in small increments, to prevent sudden cooling of the batch and also to prevent the possibility of suddenly exceeding the pressure limitations of the reaction vessel. The introduction of the ethylene oxide is continued to raise the pressure gradually to about 45 to 48 p.s.i. If necessary, cooling water is introduced through the water jacket surrounding the vessel in order to control the reaction. The balance of the ethylene oxide is added slowly until it is exhausted, after which the reaction is allowed to continue until the pressure within the reaction vessel drops approximately to the level of pressure prevailing at the start of the reaction, before any ethylene oxide was introduced, i.e., about 20 p.s.i. During the final addition of ethylene oxide and the completion of the reaction, heating or cooling is carried out to maintain the temperature at approximately 205° to 215° F. The reaction generally requires from about one to three hours for completion, at which point the pressure within the vessel drops to about 18 to 20 p.s.i. and cooling of the vessel is then carried out to lower the temperature of the batch to abotu 140° F. or less. Nitrogen is added to the kettle to prevent formation of a vacuum as the reaction vessel is cooled. A sample may then be withdrawn for testing, and, if the results are satisfactory, the batch is further cooled to about 80° F. or lower.

If the assay is not satisfactory, the batch is purged with nitrogen and reheated to about 205° F. More ethylene oxide is then added in the necessary amount as determined by the assay.

If the assay or analysis is satisfactory, the batch is cooled to about 80° F. or below and then filtered.

After filtration, the cake formed in the filter is allowed to stand for about two to three days until it is free of the odor of the inert reaction medium, Skellysolve C. Alternatively, the filtered material may be spread on trays and oven dried at 140° to 160° F., this operation requiring about one day for completion.

Example 1

Into a 400-gallon closed reaction vessel is introduced approximately 480 pounds of polyvinyl alcohol (du Pont "Elvanol"—Grade 71–30) slurried with approximately 1200 pounds of Skellysolve C. The reaction vessel is purged with nitrogen. An assay of the polyvinyl alcohol indicated a moisture content of 6.0 percent by weight. Steam is then introduced into the jacket of the reaction vessel to raise the temperature to about 70° C., at which point distillation commences. During the distillation, the temperature of the slurry is finally raised to about 80° C. Skellyslove C and water are condensed and recovered, until about 19.2 pounds of water have been removed. This removal reduces the moisture content of the polyvinyl alcohol to approximately 2.0 percent.

The reaction vessel is then again purged with nitrogen and the temperature of the batch is raised to 96° C. At this point the internal pressure of the reaction vessel is about 20 pounds pi.s.i.

Ethylene oxide is then added to the reaction vessel slowly and with agitation of the batch. The temperature is maintained between about 92° to 97° C and the pressure at from 40 to 49 pounds. p.s.i. Additions of ethylene oxide are continued for approximately six hours until a total 173 pounds of ethylene oxide have been added. After the addition of ethylene oxide is completed, the reaction proceeds for two more hours. The batch is then cooled over night and is filtered in a crock filter. The product is dried until free from the odor of Skellysolve C and yields about 560 pounds of material in the form of a light yellow powder.

An analysis of the product indicates that the ethoxylated polyvinyl alcohol contains approximately 14.3 percent of combined ethylene oxide and about 8.8 percent of free ethylene glycols. A cast film produced from this product is characterized by good low temperature flexibility and is readily heat sealed to itself.

Example 2

Using a procedure similar to that described in Example 1, about 600 pounds of polyvinyl alcohol having a moisture content of 6.5 percent is slurried with 960 pounds of Skellysolve C. The slurry is heated to distill off water and Skellysolve C and about 18 pounds of water are removed to reduce the percent moisture of the polyvinyl alcohol to 3.5 percent.

The slurry is then reacted with 216 pounds of ethylene oxide. During the reaction, the temperature is maintained at 96° to 98° C. and the pressure at 45 to 49 pounds p.s.i. The ethylene oxide is added over a period of five and a half hours and an additional hour is taken to complete the reaction. The resultant product is filtered, dried and screened, thereby recovering a total of 744 pounds of light powder having a solids content of 91.1 percent.

An analysis of the product indicates a combined ethylene oxide content of 18.5 percent and a free ethylene glycol content of 10.5 percent. Because of the hydroscopic nature of the product, there is also a small amount of moisture in the final powdered material that is recovered.

Example 3

A charge of 450 pounds of polyvinyl alcohol having a moisture content of 6 percent is slurried in 780 pounds of Skellysolve C. The slurry is then heated to distill off about 13.5 pounds of water, reducing the moisture content of the polyvinyl alcohol to about 3.0 percent. The slurry is then reacted with 134 pounds of ethylene oxide. In this procedure the reaction temperature was maintained at about 80° to 90° C. for four hours, during which time 115 pounds of the ethylene oxide is added. During the next hour, no ethylene oxide was added and the temperature was raised to about 96° to 98° C., at which temperature the remaining ethylene oxide was added over a period of about two and a half hours. Pressures up to 49 pounds p.s.i. were used during this reaction procedure. Approximately 518 pounds of light yellow pulverulent product was obtained.

Upon analysis, the product was shown to have a combined ethylene oxide content of approximately 13.66 percent and a free ethylene glycol content of 9.85 percent.

Example 4

A charge of 650 pounds of polyvinyl alcohol having a moisture content of 7 percent was slurried in 1040 pounds of Skellysolve C. The slurry was heated to about 80° C. to distill off about 19.5 pounds of water and to reduce the moisture content of the polyvinyl alcohol to about 4.0 percent.

The slurry was reacted with two portions of ethylene oxide. The first addition of 234 pounds of ethylene oxide was made at 87° to 93° C. over a period of ten hours and at a pressure of from 40 to 48 pounds p.s.i. This resulted in a product which in dry form is almost white and which had a combined ethylene oxide content of 6.05 percent, with an ethylene oxide content in the form of glycols of 9.25 percent for a total (reacted) ethylene oxide content of 15.3 percent.

Next, a total of 150 pounds more of ethylene oxide was added to a reaction temperature of 96° to 98° C. over a period of six hours to yield (after filtration, drying and screening) a total of 950 pounds of material. Upon analysis, the product was found to have a combined ethylene oxide content of 14.2 percent and 13.9 percent of ethylene oxide converted to free ethylene glycols.

Resin films cast by conventional film casting techniques from the products obtained in the foregoing examples are characterized by good low temperature flexibility and heat sealing properties. Multiple runs of the process and testing of the products indicate that the moisture content of the starting polyvinyl alcohol should be in the range of 0.1 to 5.0 percent in order to obtain the desired properties in the resin products.

While present preferred embodiments of the invention have been described, it will be recognized that the invention may be otherwise variously embodied and practiced within the scope of the following claims.

What is claimed is:

1. A process of producing ethoxylated polyvinyl alcohol, which comprises reacting at temperatures within the range of 95° to 105° C. and pressures within the range of 45 to 55 pounds per square inch 35 to 40 parts by weight of ethylene oxide with 100 parts by weight of a polyvinyl alcohol having a moisture content of from 0.1 to 5.0 percent by weight while dispersed in from 125 to 175 parts by weight of a substantially $C_7$ paraffinic hydrocarbon.

2. A process for ethoxylating polyvinyl alcohol which comprises removing moisture from the starting charge of polyvinyl alcohol to reduce its moisture content to the range of from 0.1 to 5.0 percent by weight, reacting at temperatures within the range of 80° to 120° C. and pressures within the range of 30 to 200 pounds per square inch 25 to 40 parts by weight of ethylene oxide with 100 parts by weight of said polyvinyl alcohol while dispersed in from 100 to 600 parts by weight of a substantially $C_7$ paraffinic hydrocarbon in which said ethylene oxide, said polyvinyl alcohol and said ethoxylated polyvinyl alcohol are all substantially insoluble, and recovering therefrom the ethoxylated polyvinyl alcohol.

3. A process for ethoxylating polyvinyl alcohol which comprises forming in a reaction vessel a slurry of 100 parts by weight of polyvinyl alcohol dispersed in from 100 to 600 parts by weight of a substantially $C_7$ paraffinic hydrocarbon in which ethylene oxide, said polyvinyl alcohol and ethoxylated polyvinyl alcohol are all substantially insoluble, heating said slurry to distill off sufficient water to reduce the moisture content of said polyvinyl alcohol to the range of from 0.1 to 5.0 percent by weight, introducing 25 to 40 parts by weight of ethylene oxide into said vessel, reacting said ethylene oxide with said polyvinyl alcohol in said slurry at temperatures within the range of from 80° to 120° C. and pressures within the range of 30 to 200 pounds per square inch to produce ethoxylated polyvinyl alcohol and recovering said ethoxylated polyvinyl alcohol.

4. A process for producing ethoxylated polyvinyl alcohol, which, in the form of a cast resin film, is capable of strong bonding by heat sealing and exhibits good low temperature flexibility, comprising the steps of removing moisture from the starting charge of polyvinyl alcohol to reduce its moisture content to the range of from 0.1 to 5.0 percent by weight, reacting at temperatures within the range of 95° to 105° C. and pressures within the range of 45 to 55 pounds per square inch 35 to 40 parts by weight of ethylene oxide with 100 parts by weight of said polyvinyl alcohol while dispersed in from 125 to 175 parts by weight of a substantially $C_7$ paraffinic hydrocarbon in which said ethylene oxide, said polyvinyl alcohol and said ethoxylated polyvinyl alcohol are all substantially insoluble, and recovering therefrom the ethoxylated polyvinyl alcohol.

5. The product of the process described in claim 2.

References Cited in the file of this patent

UNITED STATES PATENTS

| | | |
|---|---|---|
| 2,844,570 | Broderick | July 22, 1958 |
| 2,844,571 | Broderick | July 22, 1958 |
| 2,990,398 | Inskip | June 27, 1961 |